United States Patent
Kim et al.

(10) Patent No.: US 12,449,889 B2
(45) Date of Patent: Oct. 21, 2025

(54) DVFS CONTROLLING METHOD, SEMICONDUCTOR DEVICE AND SEMICONDUCTOR SYSTEM USING THE DVFS CONTROLLING METHOD

(71) Applicant: SAMSUNG ELECTRONICS CO., LTD., Suwon-si (KR)

(72) Inventors: Jung Ho Kim, Suwon-si (KR); Sung Sup Lim, Yongin-si (KR)

(73) Assignee: Samsung Electronics Co., Ltd.

( * ) Notice: Subject to any disclaimer, the term of this patent is extended or adjusted under 35 U.S.C. 154(b) by 344 days.

(21) Appl. No.: 18/096,798

(22) Filed: Jan. 13, 2023

(65) Prior Publication Data

US 2023/0266815 A1  Aug. 24, 2023

(30) Foreign Application Priority Data

Feb. 18, 2022  (KR) .................. 10-2022-0021309

(51) Int. Cl.
*G06F 1/3296* (2019.01)
*G06F 9/48* (2006.01)
*G06F 11/34* (2006.01)

(52) U.S. Cl.
CPC .......... *G06F 1/3296* (2013.01); *G06F 9/4881* (2013.01); *G06F 11/3419* (2013.01)

(58) Field of Classification Search
CPC .. G06F 1/3296; G06F 9/4881; G06F 11/3419; G06F 1/324; G06F 2209/5019; G06F 1/3206; G06F 1/329; G06N 3/063; G06N 3/04; Y02D 10/00
See application file for complete search history.

(56) References Cited

U.S. PATENT DOCUMENTS

| | | |
|---|---|---|
| 10,140,573 B2 | 11/2018 | Julian et al. |
| 10,140,677 B2 | 11/2018 | Kim et al. |
| 10,613,144 B2 | 4/2020 | Lee et al. |
| 10,725,525 B2 | 7/2020 | Park et al. |
| 2007/0245317 A1* | 10/2007 | Hong ............ G06F 1/3243 717/130 |
| 2014/0184619 A1 | 7/2014 | Kim |
| 2018/0300838 A1* | 10/2018 | Park ................. G06F 3/14 |
| 2019/0250691 A1 | 8/2019 | Lee et al. |

(Continued)

FOREIGN PATENT DOCUMENTS

| | | |
|---|---|---|
| KR | 20150112660 A | 10/2015 |
| KR | 20180071056 A | 6/2018 |
| KR | 20200117701 A | 10/2020 |

*Primary Examiner* — Jaweed A Abbaszadeh
(74) *Attorney, Agent, or Firm* — Fish & Richardson P.C.

(57) ABSTRACT

A semiconductor system is provided. The semiconductor system comprises a memory device storing a program for executing a DVFS controller, and a neural network processing unit using a neural network model, reading the program for executing the DVFS controller from the memory device and executing the read program, wherein the DVFS controller includes an information collector receiving data for each neural network model, a first work amount estimator estimating an execution time of a processing task of the processor and workload of the processor for each neural network model, and a second work amount estimator estimating a total workload required for the processor from the workload of the processor for each neural network model.

20 Claims, 6 Drawing Sheets

(56) References Cited

U.S. PATENT DOCUMENTS

2019/0272002 A1\* 9/2019 Seenappa ............... G06F 1/324
2019/0362005 A1\* 11/2019 Sen ................. G06F 16/24532
2021/0165477 A1 6/2021 Ding et al.

\* cited by examiner

DVFS CONTROLLING METHOD, SEMICONDUCTOR DEVICE AND SEMICONDUCTOR SYSTEM USING THE DVFS CONTROLLING METHOD

CROSS-REFERENCE TO RELATED APPLICATION

This application claims priority from Korean Patent Application No. 10-2022-0021309 filed on Feb. 18, 2022 in the Korean Intellectual Property Office and all the benefits accruing therefrom under 35 U.S.C. 119, the contents of which in their entirety are herein incorporated by reference.

BACKGROUND

Technical Field

The present disclosure relates to a semiconductor device and a semiconductor system using dynamic voltage frequency scaling (DVFS).

Description of the Related Art

With the development of information communications, electronic devices such as mobile devices may include high-performance processors in order to quickly process large amounts of data. Such electronic devices may include processors such as central processing units (CPU), a graphic processing units (GPU), and a neural network processing units (NPU).

Dynamic Voltage Frequency Scaling (DVFS) is a technology that dynamically adjusts the operating frequency and an operating voltage of a device by using an algorithm.

For example, in an electronic device and an electronic system, which use a processor based on a neural network model, there is an increasing need to reduce power consumption by lowering the operating frequency level of the processor while satisfying the execution time requirements for each neural network model.

BRIEF SUMMARY

An object of the present disclosure is to provide a DVFS controlling method that may reduce power consumption while satisfying the execution time requirements for each neural network model.

Another object of the present disclosure is to provide a semiconductor device and a semiconductor system, which may reduce power consumption while satisfying the execution time requirement for each neural network model.

According to an embodiment of the present disclosure, there is provided a semiconductor system comprising a memory device storing a program for executing a DVFS controller, and a neural network processing unit using a neural network model, reading the program for executing the DVFS controller from the memory device and executing the read program, wherein the DVFS controller includes an information collector receiving data for each neural network model, a first work amount estimator estimating an execution time of a processing task of the processor and workload of the processor for each neural network model, and a second work amount estimator estimating a total workload required for the processor from the workload of the processor for each neural network model.

According to the aforementioned and other embodiments of the present disclosure, there is provided an operating method of a semiconductor device, the semiconductor device comprising a memory device storing a program for executing a DVFS controller, and a processor using a neural network model, reading the program for executing the DVFS controller from the memory device and executing the read program, and the DVFS controller receives data for each neural network model, estimates an execution time of a processing task of the processor and a workload of the processor for each neural network model, and controls an operating frequency of the processor to be determined by estimating a total workload of the processor from the workload of the processor for each neural network model.

According to the aforementioned and other embodiments of the present disclosure, there is provided a DVFS controlling method of determining an operating frequency of a processor using a neural network model, the DVFS controlling method comprising receiving data for each neural network model from the exterior, estimating an execution time of a processing task of the processor and a workload of the processor for each neural network model, and controlling an operating frequency of the processor to be output by estimating a total workload of the processor from the workload of the processor for each neural network model.

The objects of the present disclosure are not limited to those mentioned above and additional objects of the present disclosure, will be clearly understood by those skilled in the art from the following description of the present disclosure.

BRIEF DESCRIPTION OF THE DRAWINGS

The above and other aspects and features of the present disclosure will become more apparent by describing exemplary embodiments thereof in detail, with reference to the attached drawings, in which.

DETAILED DESCRIPTION OF THE PREFERRED EMBODIMENT

Hereinafter, embodiments according to technical aspects of the present disclosure will be described with reference to the accompanying drawings.

Figure 1:
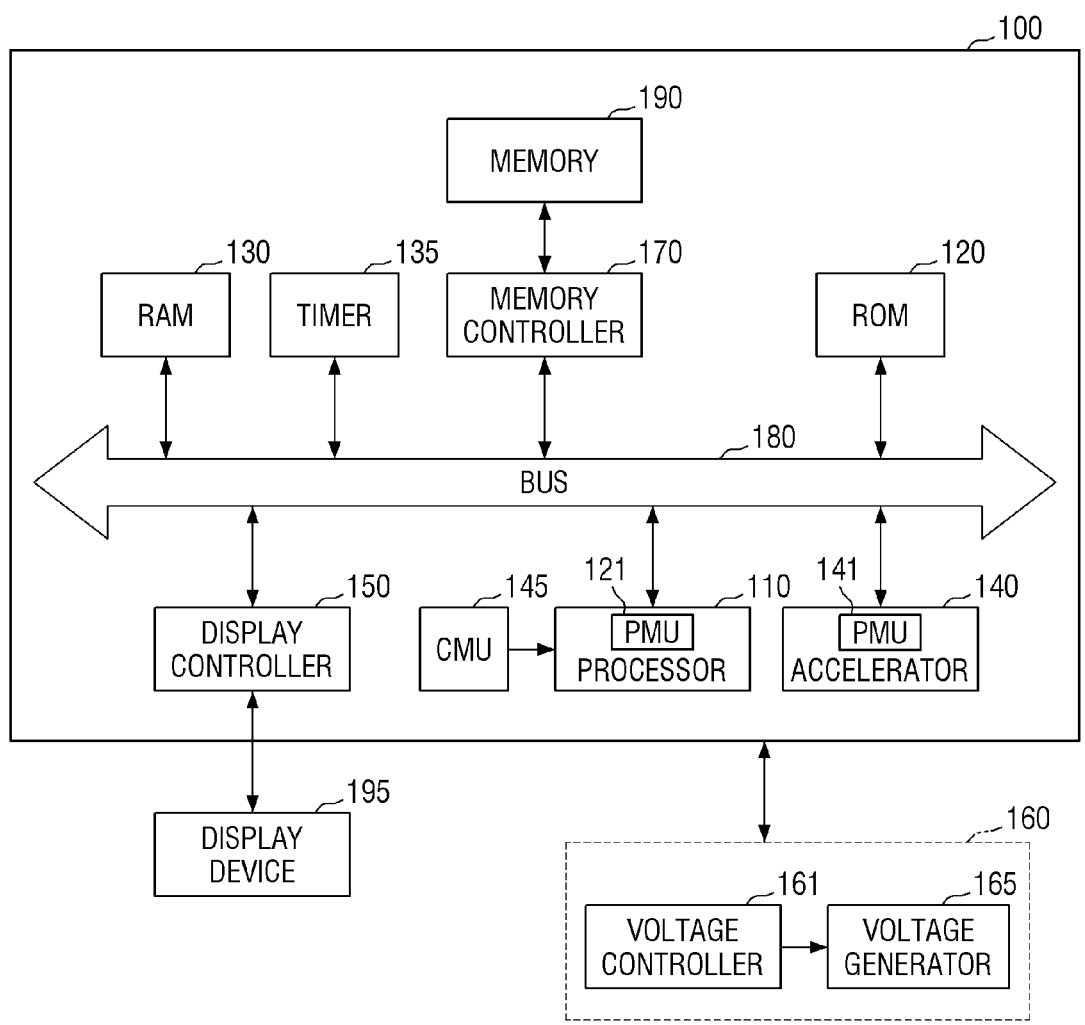
FIG. 1 is a block diagram illustrating a semiconductor system according to some embodiments.
Figure 2:
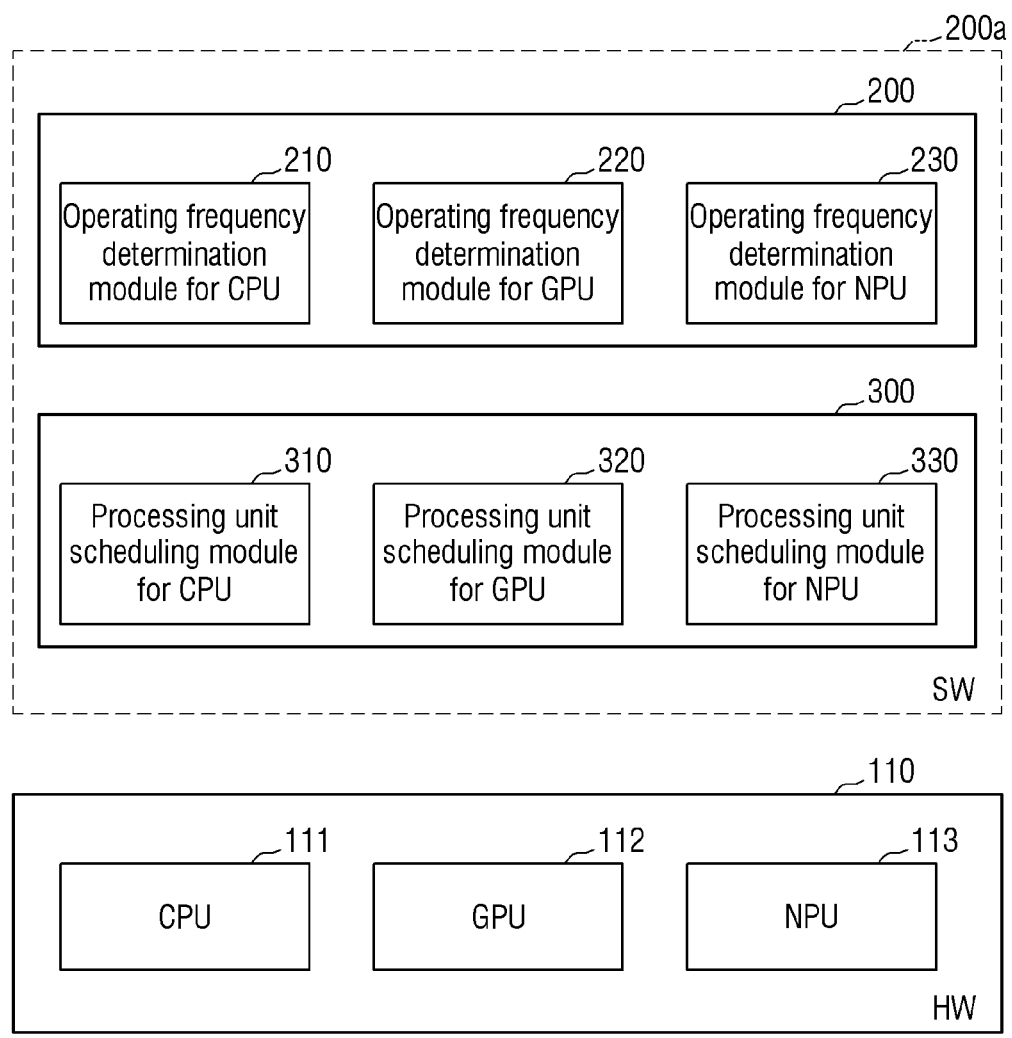
FIG. 2 is a diagram illustrating a DVFS controller and a processor, which are included in a semiconductor system according to some embodiments.
Figure 3:
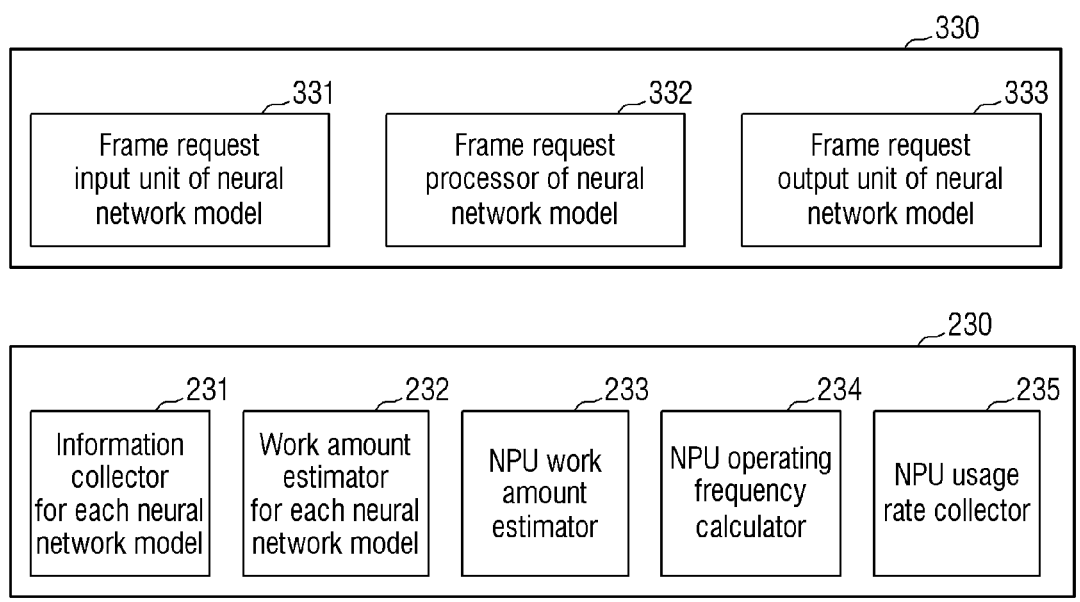
FIG. 3 is a diagram illustrating an operating frequency determination module for an NPU and a processing unit scheduling module for the NPU, which are included in a semiconductor system according to some embodiments.
Figure 4:
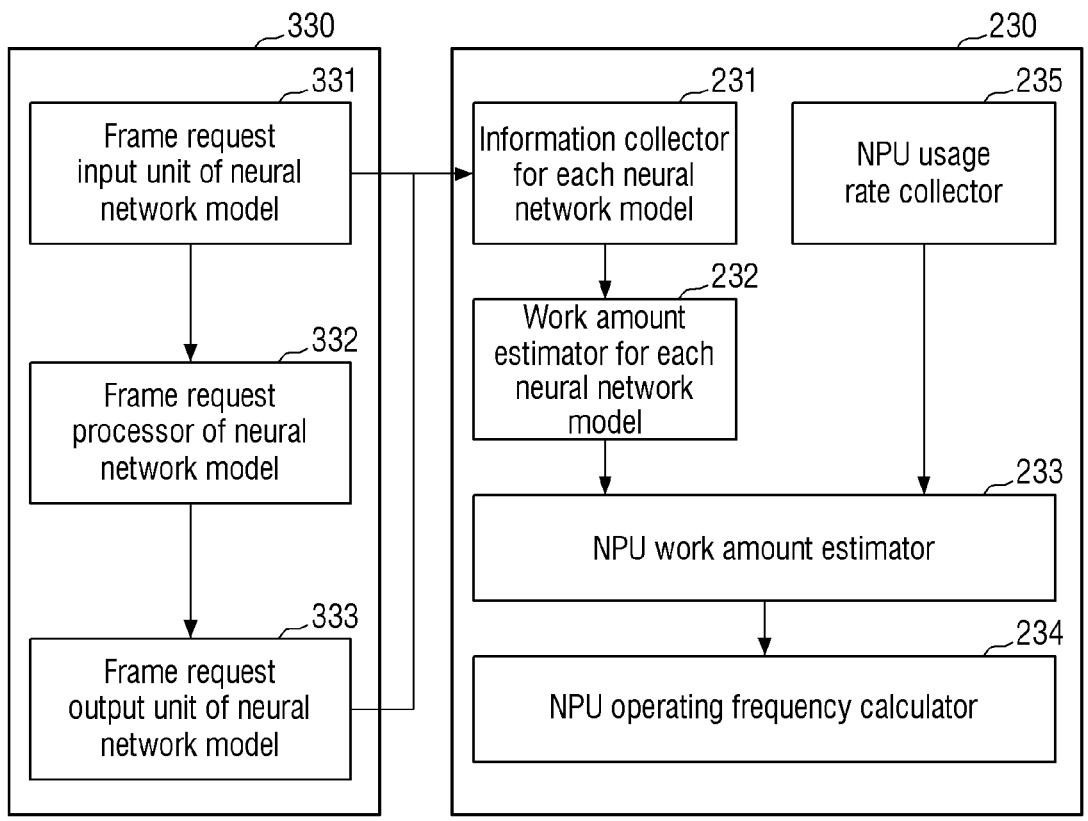
FIG. 4 is a diagram illustrating an operation of an operating frequency determination module for the NPU and a processing unit scheduling module for the NPU, which are included in a semiconductor system according to some embodiments.

FIG. 1 is a block diagram illustrating a semiconductor system according to some embodiments. FIG. 2 is a diagram illustrating a DVFS controller and a processor, which are included in a semiconductor system according to some embodiments. FIG. 3 is a diagram illustrating an operating frequency determination module for an NPU and a processing unit scheduling module for the NPU, which are included in a semiconductor system according to some embodiments. FIG. 4 is a diagram illustrating an operation of an operating frequency determination module for the NPU and a processing unit scheduling module for the NPU, which are included in a semiconductor system according to some embodiments.

Referring to FIG. 1, the semiconductor system 10 may be implemented as a handheld device such as a mobile phone, a smart phone, a tablet computer, a personal digital assistant (PDA), an enterprise digital assistant (EDA), a digital still camera, a digital video camera, a portable multimedia player (PMP), a personal navigation device, a hand held game console or e-book.

The semiconductor system 10 may include a semiconductor device (SoC: system on chip) 100, a memory device 190, and a display device 195. The semiconductor device 100 may include a processor 110, a read only memory (ROM) 120, a random access memory (RAM) 130, a timer 135, an accelerator 140, a clock management unit (CMU) 145, a display controller 150, a memory controller 170, and a bus 180. The semiconductor system 10 may further include a power management IC (PMIC) 160.

In the embodiment of FIG. 1, the PMIC 160 is implemented externally of the semiconductor device 100, but in other embodiments, the PMIC 160 may be implemented integrally with the semiconductor device 100. The PMIC 160 may include a voltage controller 161 and a voltage generator 165.

The processor 110 may process or execute programs and/or data, which are stored in the memory device 190. For example, the processor 110 may process or execute the programs and/or the data in response to a clock signal output from a clock signal generator (not shown).

The processor 110 may be implemented as a multi-core processor. The multi-core processor is one computing component having two or more independent substantial processors (referred to as 'cores'), each of which may read and execute program instructions.

A performance monitoring unit (PMU) 121 may be provided inside the processor 110 or at a front end of the processor 110.

The programs and/or data, which are stored in the ROM 120, the RAM 130 and the memory device 190, may be loaded into the memory device of the processor 110 as needed.

The ROM 120 may store permanent programs and/or data. The ROM 120 may be implemented as an erasable programmable read-only memory (EPROM) or an electrically erasable programmable read-only memory (EEPROM).

The RAM 130 may temporarily store programs, data or instructions. For example, the programs and/or the data, which are stored in the memory 120 or 190, may be temporarily stored in the RAM 130 under the control of the processor 110 or in accordance with a booting code stored in the ROM 120. The RAM 130 may be implemented as a dynamic (DRAM) or a static RAM (SRAM).

The accelerator 140 may be a hardware device or co-processor for improving processing performance of multimedia or multimedia data, for example, text, audio, still images, animation, video, two-dimensional data or three-dimensional data.

For convenience of description, although only one accelerator 140 is illustrated in FIG. 1, the semiconductor device 100 may include one or more accelerators in accordance with an embodiment. For example, an application program may execute at least one accelerator.

A performance monitoring unit (PMU) 141 may be provided inside the accelerator 140 or at a front end of the accelerator 140. The performance monitoring unit 141 is a module for measuring performance of the accelerator 141. For example, the performance monitoring unit 141 may monitor the amount of data input to the accelerator 141 and/or the amount of data output from the accelerator 141, or may monitor the memory usage of the accelerator 141.

The CMU 145 generates an operating clock signal. The CMU 145 may be comprised of a clock generator such as a phase locked loop (PLL) circuit, a delayed locked loop (DLL), a crystal and the like.

The operating clock signal may be supplied to the processor 110. The operating clock signal may be supplied to another component (e.g., a memory controller, etc.).

The CMU 145 may change the frequency of the operating clock signal under the control of the DVFS controller (200*a* of FIG. 2). For example, the DVFS controller 200*a* may perform a DVFS protocol operating in a closed-loop system and an open-loop system, which will be described later, in accordance with information from the semiconductor device, which is collected in software or hardware.

The DVFS controller 200*a* may control the CMU 145 in accordance with the DVFS protocol and thus, the CMU 145 may determine the frequency of the operating clock signal under the control of the DVFS controller 200*a* to perform the DVFS protocol.

The voltage controller 161 may control the voltage generator 165 based on the DVFS protocol performed by the DVFS controller 200*a*. The voltage generator 165 may generate and output an operating voltage of the semiconductor device 100 based on the DVFS protocol under the control of the voltage controller 161.

The memory controller 170 is a block for interfacing with the memory device 190. The memory controller 170 generally controls the operation of the memory device 190, and also controls data exchange between a host and the memory device 190. For example, the memory controller 170 controls the memory controller 170 in accordance with a request of the host to write data in the memory device 190 or read data from the memory device 190. In such a case, the host may be a device such as the processor 110, the accelerator 140 and the display controller 150, but the technical aspects of the present disclosure are not limited thereto.

The memory device 190 is a storage for storing data, and may store an operating system (OS), various programs and various data. The memory device 190 may be a DRAM, but is not limited thereto. For example, the memory device 190 may be a non-volatile memory device (flash memory, PRAM, MRAM, ReRAM or FeRAM). In some embodiments, the memory device 190 may be an embedded memory provided internally of the semiconductor device 100.

The respective components 110, 120, 130, 140, 150 and 170 may communicate with each other via the system bus 180.

The display device 195 may display multimedia accelerated or processed data by the software accelerator or hardware accelerator 140 loaded into the processor 110. The display device 195 may be an LED, an OLED device or another type of device. The display controller 150 may control the operation of the display device 195.

Referring to FIGS. 1 and 2, the DVFS controller 200*a* may be implemented in software (SW) or firmware. The DVFS controller 200*a* may be implemented as a program and loaded on the memory device 130, 120 or 190, and may be read and executed by the processor 110 when the semiconductor device 100 is powered on.

The DVFS controller 200a may include a scheduling module 300 and an operating frequency determination module 200. The scheduling module 300 may schedule operational steps of the processor 110, that is, frames that are processing units, when requested. The operating frequency determination module 200 may determine a requested operating frequency for each processor 110.

The scheduling module 300 may include a processing unit scheduling module 310 for a CPU, a processing unit scheduling module 320 for a GPU and a processing unit scheduling module 330 for the NPU. The operating frequency determination module 200 may include an operating frequency determination module 210 for the CPU, an operating frequency determination module 220 for the GPU and an operating frequency determination module 230 for the NPU. For example, the processing unit scheduling module 330 for the NPU may schedule the frames of an NPU 113 when the frames of the NPU 113 are requested, and the operating frequency determination module 230 for the NPU may determine a requested operating frequency of the NPU 113.

The DVFS controller 200a may control the processor 110, the memory devices 130, 120, 190, the timer 135, the PMUs 121 and 141, the CMU 145 and the PMIC 160. The processor 110, the memory devices 130, 120, 190, the timer 135, the PMUs 121 and 141, the CMU 145 and the PMIC 160 may be implemented in hardware (HW), respectively.

The processor 110 may include a computing device such as a CPU 111, a GPU 112 and an NPU 113, but the technical aspects of the present disclosure are not limited thereto.

An operating system (OS) may be interposed between the DVFS controller 200a and the memory devices 130, 120, 190, the timer 135, the plurality of PMUs 121 and 141, the CMU 145 and the PMIC 160.

Referring to FIGS. 3 and 4, the processing unit scheduling module 330 for the NPU may include a frame request input unit 331 of a neural network model, a frame request processor 332 of a neural network model and a frame request output unit 333 of a neural network model. The operating frequency determination module 230 for the NPU may include an information collector 231 for each neural network model, a work amount estimator 232 for each neural network model, an NPU work amount estimator 233, an NPU operating frequency calculator 234 and an NPU usage rate collector 235.

The frame request input unit 331 of the neural network model may generate a request for processing tasks of the NPU 113 for each neural network model, that is, a frame request. The frame request input unit 331 of the neural network model may transfer data on the neural network model and data on the start time of execution of the frame request to the information collector 231 for each neural network model, which will be described later.

The frame request processor 332 of the neural network model may receive the frame request from the frame request input unit 331 of the neural network model and process the processing task of the NPU 113 for each neural network model.

The frame request output unit 333 may output a result of the processing operation of the NPU 113 for each neural network model and transfer data on the completion time of execution of the frame request to the information collector 231 for each neural network model.

The information collector 231 for each neural network model may receive data for each neural network model. The data for each neural network model may include first data on the execution time of the processing task of the NPU 113 for each neural network model and second data for optimizing the processing task of the NPU 113 for each neural network model. In some embodiments, the execution time of the processing task of the NPU 113 for each neural network model may be the time required to process one frame input by the NPU 113.

For example, the first data may be dynamic data including at least one of data on details of the execution time calculated based on the execution start time and the execution completion time of the processing task of the NPU 113 for each neural network model.

For example, the second data may be static data including at least one of data related to instructions of the processing task of the NPU 113, that is, the number of the instructions, data related to whether the instructions are performed in the plurality of NPUs 113 sequentially or in parallel, data for optimizing the instructions output from a compiler, data related to a target operating frequency of the NPU 113 or data related to target memory access performance of the NPU 113.

The work amount estimator 232 for each neural network model may estimate the execution time of the processing task of the NPU 113 for each neural network model and the amount of work of the processing task of the NPU 113. In some embodiments, the amount of work of the NPU 113 may be a workload of the NPU 113.

The work amount estimator 232 for each neural network model may exist for each neural network model. The work amount estimator 232 for each neural network model may estimate the execution time of next processing task of the NPU 113 from the first data.

In detail, in a first execution step, the work amount of the NPU 113 may be estimated to be infinite, and then, in a second execution step of an (n)th step, the work amount of the NPU 113 may be estimated based on the first data. The first and second execution steps may operate in a closed-loop system. In this case, the work amount of the NPU 113 may be estimated based on the execution time of a previous processing task of the NPU 113 and the NPU operating frequency.

For example, a neural network model based on machine learning technology may be applied to a mobile device that includes a semiconductor device 100. For example, the neural network model may include a first neural network model for sensing an object through a camera module of the mobile device and a second neural network model for identifying the sensed object. Since a request frequency of the frame request may be different for each neural network model, weight values for the dynamic data and the static data, which is described above, may be also different for each neural network model.

The NPU work amount estimator 233 may estimate a total amount of work required for the NPU 113 based on the first data and the second data. This may operate in an open-loop system. In this case, the work amount of the NPU 113 may be estimated based on the execution time of a previous processing task of the NPU 113 and the NPU operating frequency. A the same time, in this case, the workload of the NPU 113 for each neural network model may be estimated before the processing task of the NPU 113 for each neural network models is completed.

The NPU operating frequency calculator 234 may output the operating frequency of the NPU 113 based on the estimated execution time of the processing task of the NPU 113. In this case, the operating frequency of the NPU 113 may be determined before the processing task of the NPU 113 for each neural network model is completed. In this case, the operating voltage for next cycle may be determined based on the output operating frequency.

The NPU usage rate collector 235 may collect data related to a usage rate of the NPU 113. The NPU usage rate collector 235 may transfer the collected data related to the usage rate of the NPU 113 to the NPU work amount estimator 233.

For example, since the NPU based on the neural network model requires a large number of computing operations for classification of images, it may have high complexity and consume large resources, such as power, etc.

In some embodiments, after the work amount for each neural network model is estimated, the processing task of the NPU for each neural network model may be completed. In addition, the processing task of the NPU for each neural network model may be completed after the operating frequency of the NPU is determined. Therefore, an operating frequency level of the NPU may be lowered within the range such that user responsiveness is not deteriorated as compared with a case in which the operating frequency level of the NPU is changed after all the NPU processing tasks for the neural network model are performed. As a result, in a semiconductor system that uses a high-performance processor such as the NPU, a DVFS protocol may be used to reduce power consumption of the NPU while satisfying the execution time of the processing task of the NPU, which is required for each neural network model.

Figure 5:
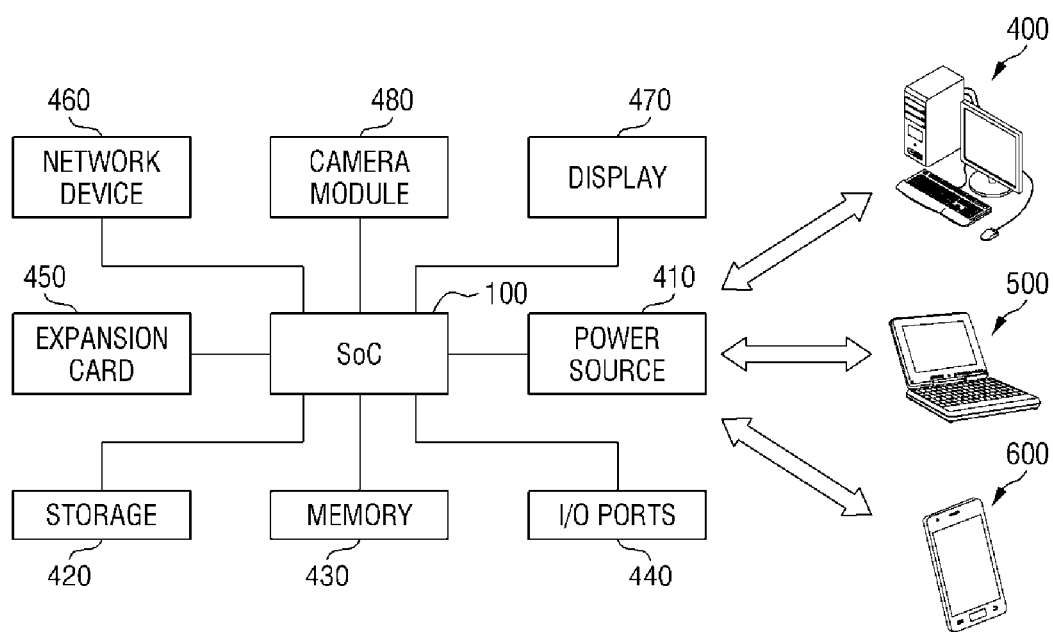
FIG. 5 is a diagram illustrating a semiconductor system according to some embodiments.

FIG. 5 is a diagram illustrating a semiconductor system according to some embodiments.

Referring to FIG. 5, electronic systems 400, 500 and 600 may be implemented as a personal computer (PC) or a data server, a laptop computer or a portable device. The portable device may be implemented as a mobile phone, a smart phone, a tablet PC, a personal digital assistant (PDA), an enterprise digital assistant (EDA), a digital still camera, a digital video camera, a portable multimedia player (PMP), a personal navigation device, or a handheld game console or an e-book.

The electronic system 400, 500 or 600 includes an SoC 100, a power source 410, a storage device 420, a memory 430, input/output ports 440, an expansion card 450, a network device 460 and a display 470. In accordance with an embodiment, the electronic system 400, 500 or 600 may further include a camera module 480.

The SoC 100 may refer to the semiconductor device 100 shown in FIG. 1. The SoC 100 may control the operation of at least one of the components 410 to 480.

The power source 410 may supply an operating voltage to at least one of the components 100 and 420 to 480.

The storage device 420 may be implemented as a hard disk drive or a solid state drive SSD.

The memory 430 may be implemented as a volatile memory or a non-volatile memory, and may correspond to the memory device 190 of FIG. 1. According to an embodiment, a memory controller capable of controlling data access operations for the memory 430, e.g., read operations, write operation (or program operation) or erase operation may be integrated or embedded in the processor 110. According to a further embodiment, the memory controller may be implemented between the processor 110 and the memory 430.

The input/output ports 440 may refer to ports capable of transmitting data to the electronic systems 400, 500 and 600 or transmitting data output from the electronic systems 400, 500 and 600 to an external device. For example, the input/output ports 440 may be ports for connecting a pointing device such as a computer mouse, ports for connecting a printer or ports for connecting a USB drive.

The expansion card 450 may be implemented as a secure digital (SD) card or a multimedia card (MMC). According to an exemplary embodiment, the expansion card 450 may be a Subscriber Identity Module (SIM) card or a Universal Subscriber Identity Module (USIM) card.

The network device 460 may be a device capable of connecting the electronic systems 400, 500 and 600 to a wired network or a wireless network.

The display 470 may display data output from the storage device 420, the memory 430, the input/output ports 440, the expansion card 450 or the network device 460.

The camera module 480 refers to a module capable of converting an optical image into an electrical image. Therefore, the electrical image output from the camera module 480 may be stored in the storage device 420, the memory 430 or the expansion card 450. The electrical image output from the camera module 480 may be also displayed through the display 420.

Figure 6:
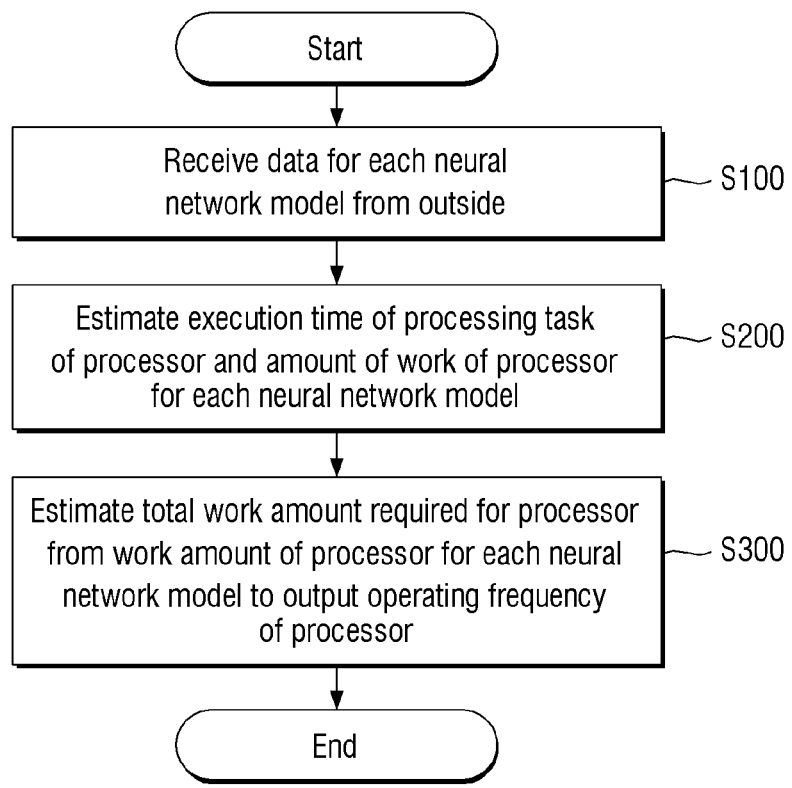
FIG. 6 is a flow chart illustrating a DVFS controlling method of a semiconductor system according to some embodiments.

FIG. 6 is a flow chart illustrating a DVFS controlling method of a semiconductor system according to some embodiments.

The DVFS controlling method according to some embodiments may determine an operating frequency of a neural processing unit using a neural network model.

First, the DVFS controller 200a according to some embodiments may receive data for each neural network model from the exterior (S100). For example, the information collector 231 for each neural network model may receive data for each neural network model from a software and application developer for executing an application, but the technical aspects of the present disclosure are not limited thereto.

Afterwards, the execution time and workload of the processing task of the NPU 113 for each neural network model may be estimated (S200). The data for each neural network model may include first data related to the execution time of the processing task of the NPU 113 for each neural network model. In this case, the DVFS controlling method according to some exemplary embodiments may include a first path in which the workload of the NPU 113 is estimated as the amount of a first work, e.g., infinity, and the workload of the NPU 113 from the first data is estimated as the amount of a second work. The first path may operate in a closed-loop system.

The data for each neural network model may further include second data for optimizing the processing task of the NPU 113 for each neural network model. In this case, the DVFS controlling method according to some embodiments may further include a second path in which a total workload of the NPU 113 is estimated from the amount of a second work and the workload of the NPU 113 estimated from the second data. The second path may operate in an open-loop system.

Afterwards, the total workload of the NPU 113 may be estimated from the workload of the NPU 113 for each neural network model to output the operating frequency of the NPU 113 (S300).

Although exemplary embodiments of the present disclosure have been described with reference to the accompanying drawings, it will be apparent to those skilled in the art that the present disclosure can be fabricated in various forms without being limited to the above-described embodiments and can be embodied in other specific forms without departing from the technical aspects and essential characteristics of the present disclosure. Thus, the above embodiments are to be considered in all respects as illustrative only and not limiting.

What is claimed is:

1. A semiconductor system comprising:
a memory device storing a program for executing a dynamic voltage frequency scaling (DVFS) controller;
a neural network processing unit (NPU) configured to execute a plurality of neural network models; and
a processor configured to execute the program to execute the DVFS controller, wherein the DVFS controller includes:
an information collector configured to receive data characterizing each neural network model of the plurality of neural network models;
a first work amount estimator configured to, based on the data characterizing each neural network model of the plurality of neural network models, determine an execution time of the NPU for each neural network model of the plurality of neural network models of a and a workload of the NPU for each neural network model of the plurality of neural network models; and
a second work amount estimator configured to determine a total workload of the NPU based on the workload of the NPU for each neural network model of the plurality of neural network models,
wherein the DVFS controller is configured to control an operating frequency of the NPU based on the total workload of the NPU.

2. The semiconductor system of claim 1, wherein the data characterizing each neural network model of the plurality of neural network models comprises first data indicating an execution time of a first processing task, and wherein the first work amount estimator is configured to determine an execution time of a second processing task, next in a sequence after the first processing task, based on the first data.

3. The semiconductor system of claim 1, wherein the first work amount estimator is configured to determine the workload of the NPU for a first neural network model of the plurality of neural network models as a first workload in a first execution step, and to, in a second execution step, determine the workload of the NPU for the first neural network model as a second workload based on dynamic data of the data characterizing each neural network model, wherein the first execution step and the second execution step have a closed-loop configuration.

4. The semiconductor system of claim 2, wherein the first data includes data of an execution start time and an execution completion time of the first processing task.

5. The semiconductor system of claim 3, wherein the data characterizing each neural network model of the plurality of neural network models includes static data, and wherein the total workload of the NPU is determined based on the second workload and the static data.

6. The semiconductor system of claim 5, wherein the static data for each neural network model of the plurality of neural network models comprises at least one of: a number of instructions associated with the neural network model, an indication of whether the instructions are performed sequentially or in parallel, data for optimizing the instructions output from a compiler, data related to a target operating frequency of the NPU, or data related to target memory access performance of the NPU.

7. The semiconductor system of claim 1, comprising a scheduling module configured to transfer dynamic data indicating an execution time of a processing task of the NPU to the information collector.

8. The semiconductor system of claim 7, wherein the scheduling module includes:
a frame request input unit configured to generate a request for the processing task and transfer data indicating an execution start time of a frame request to the information collector;
a frame request processor configured to receive the frame request from the frame request input unit and process the processing task; and
a frame request output unit configured to output a result of the processing task and transfer data indicating an execution completion time of the frame request to the information collector.

9. The semiconductor system of claim 1, comprising a usage rate collector configured to collect data indicating computational resource usage by the NPU, and wherein the second work amount estimator is configured to determine the total workload of the NPU based on the data indicating the computational resource usage.

10. The semiconductor system of claim 1, wherein the DVFS controller is configured to control the operating frequency of the NPU for a first neural network model of the plurality of neural network models before processing of the first neural network model is completed.

11. An operating method of a semiconductor device, the semiconductor device comprising:
a processor configured to execute a plurality of neural network models,
wherein the operating method comprises performing dynamic voltage frequency scaling (DVFS) control of the processor by:
receiving data characterizing each neural network model of the plurality of neural network models,
based on the data characterizing each neural network model of the plurality of neural network models, determining an execution time of the processor for each neural network model of the plurality of neural network models and a workload of the processor for each neural network model of the plurality of neural network models,
determining a total workload of the processor based on the workload of the processor for each neural network model of the plurality of neural network models, and
controlling an operating frequency of the processor based on the total workload of the processor.

12. The operating method of claim 11, wherein the data characterizing each neural network model of the plurality of neural network models includes first data indicating an execution time of a processing task for the neural network model, and
wherein the method comprises:
determining the workload of the processor for each neural network model of the plurality of neural network models as a first workload in a first execution step; and
determining the workload of the processor for each neural network model of the plurality of neural network models as a second workload based on the first data in a second execution step, wherein the first execution step and the second execution step have a closed-loop configuration.

13. The operating method of claim 12, wherein the data characterizing each neural network model of the plurality of neural network models includes static data, and
wherein the method comprises determining the total workload of the processor based on the second workload and the static data.

14. The operating method of claim 11, wherein the operating method comprises:

generating a frame request of the processor for each neural network model of the plurality of neural network models;

processing a processing task of the processor for each neural network model of the plurality of neural network models based on the frame request; and outputting (i) a result of the frame request of the processor for each neural network model of the plurality of neural network models and (ii) data indicating an execution completion time of the frame request.

15. The operating method of claim 11, comprising determining the total workload of the processor based on computational resource usage by the processor.

16. A DVFS control method for determining an operating frequency of a processor executing a plurality of neural network models, the DVFS control method comprising:

receiving data characterizing each neural network model of the plurality of neural network models;

based on the data characterizing each neural network model of the plurality of neural network models, determining an execution time of the processor for each neural network model of the plurality of neural network models and a workload of the processor for each neural network model of the plurality of neural network models;

determining a total workload of the processor based on the workload of the processor for each neural network model of the plurality of neural network models; and controlling the operating frequency of the processor based on the total workload of the processor.

17. The DVFS control method of claim 16, wherein the data characterizing each neural network model comprises dynamic data, and wherein the DVFS control method includes a first path in which the workload of the processor for each neural network model of the plurality of neural network models is determined based on the dynamic data.

18. The DVFS control method of claim 17, wherein the data characterizing each neural network model of the plurality of neural network models includes static data, and wherein the DVFS control method includes a second path in which the total workload of the processor is determined based on an output of the first path and the static data.

19. The DVFS control method of claim 18, wherein the first path is configured as a closed-loop, and the second path is configured as an open-loop.

20. The DVFS control controlling method of claim 16, further comprising:

controlling the operating frequency of the processor for a first neural network model of the plurality of neural network models before processing of the first neural network model is completed; and determining a voltage for a next cycle based on the operating frequency of the processor for the first neural network model.

\* \* \* \* \*